Sept. 10, 1963 H. ZLOTNICK 3,103,442
CERAMIC DIELECTRIC COMPOSITIONS AND METHOD OF MAKING THE SAME
Filed June 27, 1961
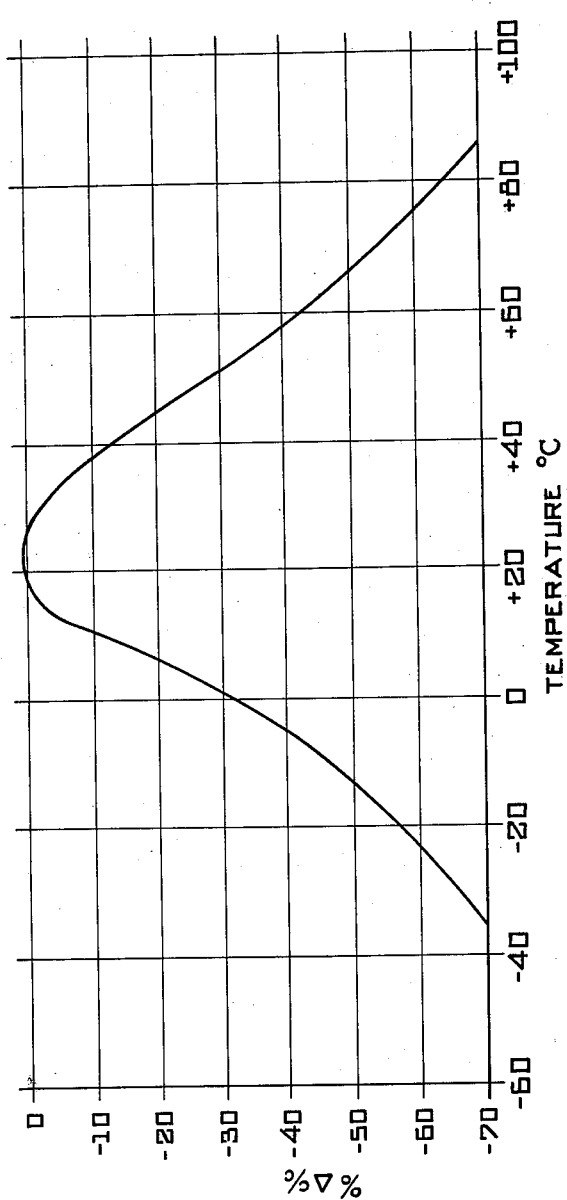
INVENTOR.
HERBERT ZLOTNICK
BY Norbert Edeier
HIS ATTORNEY United States Patent Office 3,103,442
Patented Sept. 10, 1963

3,103,442
CERAMIC DIELECTRIC COMPOSITIONS AND
METHOD OF MAKING THE SAME
Herbert Zlotnick, New York, N.Y., assignor to Mucon
Corporation, a corporation of New Jersey
Filed June 27, 1961, Ser. No. 119,984
8 Claims. (Cl. 106—39)

This invention relates to ceramic dielectric compositions and to method for making the same. More particularly, the present invention is directed to ceramic dielectric compositions having barium titanate as a major ingredient, such as find extensive use in the manufacture of capacitors or ferroelectric elements.

The ceramic dielectric materials contemplated by the present invention are of the kind usually characterized as general purpose dielectric materials, which are used as dielectric material for capacitors requiring a large capacitance in a small volume, as for example in the case of coupling or bypass capacitors. The general purpose dielectric materials are characterized by dielectric constants of from 600 upward, and will usually undergo enormous changes in capacitance at certain limited temperature ranges defining the Curie point of the material. Reference is made to Clement Patent 2,721,182, dated October 18, 1955. This patent describes a ceramic dielectric material whose dielectric constant is within the range of from 1000 to 1500 corresponding to a temperature range of from 20° C. to 110° C. The dielectric constant changes to 6200 at approximately 120° C., and then drops to 3000 at approximately 140° C. The graphs of the rise to the peak at 120° C., and of the drop from such peak have steep slopes relative to the characteristics for other temperature ranges outside of the Curie point range.

In recent years, the trend of miniaturization in the electronics industry has imposed upon the ceramic dielectric manufacturing industry ever increasingly stringent requirements of large capacitance values in as small a volume as possible. This has prompted the dielectric manufacturing industry to search for dielectrics with ever increasingly larger dielectric constants.

One object of the present invention is the provision of a general purpose ceramic dielectric material having a dielectric constant of the order of 10,000 and higher.

Another object of the invention is the provision of a general purpose ceramic dielectric material whose Curie point region reaches a peak in the range of room temperatures of from approximately 20° C. to 30° C. Realization of this object is desirable, since in numerous electronic circuit applications the capacitors are maintained at substantially room temperature, particularly so in the case of transistor and other solid state circuits employing no heater power. The shifting of the Curie point to room temperatures is in furtherance of the first mentioned object, namely provision of very high dielectric constant.

Another object of the invention is provision of a general purpose ceramic dielectric material, whose Curie point region is relatively wide, so that the capacitance value does not change very radically within the useful operating temperature range of from approximately 10° C. to 40° C. Realization of this objective is obviously desirable, since the exact operating temperature is rendered non-critical. Achievement of this objective of the invention necessarily implies a relatively gentle rise to and drop from the peak value of dielectric constant in contrast to the steep characteristics of ceramic dielectric materials of the prior art.

Another object of the invention is provision of a relatively simple and inexpensive method of manufacturing general purpose dielectric materials possessing the mentioned desirable features.

The single FIGURE of the accompanying drawing is a typical graph of the relation of percent change in capacitance versus temperature (° C.) for ceramic dielectric materials having compositions in accordance with the invention.

I have discovered that by addition of a minor amount of a rare earth oxide, such as an oxide of samarium or praseodymium, or an oxalate, fluoride or carbonate of a rare earth metal, to a composition including barium titanate as major ingredient, the desired objectives of the invention may be realized. More specifically, the compositions in accordance with the broadest preferred forms of the invention are given as follows:

| | Percentage by weight |
|---|---|
| Barium titanate (BaTiO$_3$) | 70–85 |
| Strontium titanate (SrTiO$_3$) | 0–14 |
| Calcium zirconate (CaZrO$_3$) | 8–15 |
| Manganese carbonate (MnCO$_3$) | 0–0.4 |
| One or more of oxides, oxalates, fluorides or carbonates of rare earth metals | 0.20–0.75 |

The drawing graph is typical of the above-mentioned compositions, although it is based on experimental data applicable to a somewhat more restricted group of compositions which follow below. The graph approximates a Gaussian error curve, and is substantially flat in the maximum range of from 20° C. to 25° C., deviates by about 5% from maximum at approximately 15° C. and 35° C., by about 15% at approximately 8° C. and 40° C., and by about 30% at approximately 0° C. and 50° C. The dielectric constant for the above groups of compositions is at least about 10,000, their power factor 2.5% or less at an operating frequency of one kilocycle per second, and their insulation resistance greater than 10,000 megohms, these values being given for room temperature of 25° C.

The following more restricted range of compositions, on which the drawing graph is based, yields a dielectric constant in excess of 10,000 at 25° C.:

| | Percentage by weight |
|---|---|
| Barium titanate (BaTiO$_3$) | 70–80 |
| Strontium titanate (SrTiO$_3$) | 6–12 |
| Calcium zirconate (CaZrO$_3$) | 10–15 |
| Manganese oxide (MnO) | 0.1–0.3 |
| Samarium or praseodymium trioxide | 0.20–0.75 |

Another more restricted range of compositions, which also yields a dielectric constant in excess of 10,000 at 25° C. is:

| | Percent |
|---|---|
| Barium titanate (BaTiO$_3$) | 75–85 |
| Strontium titanate (SrTiO$_3$) | 8–10 |
| Calcium zirconate (CaZrO$_3$) | 12–14 |
| Manganese oxide (MnO) | 0.2–0.4 |
| Samarium or praseodymium trioxide | 0.20–0.75 |

The above dielectric compositions may be prepared in the following manner. A mixture of the ingredients is prepared in the above specified proportions together with any of the common temporary binders, such as polyvinyl butyrate dissolved in ethyl acetate or polystyrene dissolved in toluene. The manganese is present initially in carbonate form (MnCO$_3$) and in essentially the same proportions as given for the oxide form above; during subsequent firing it is converted to MnO.

The mixture of the ingredients, temporary binder and solvents is placed in a ball mill, for example one that includes a porcelain jar and porcelain balls, and is subjected to milling action for a period of from 24 to 48 hours. A homogeneous blend is formed which has such a state of consistency that it can be readily poured to the form of thin films.

One common technique for attaining the desired film thickness is with the use of a doctor blade. This may be used in connection with the herein described compositions. When the desired viscosity is attained, the film is cast on a non-porous medium, the solvents are allowed to evaporate, and the binder to set. When adequately set, the film can be readily removed from the non-porous medium, cut to the desired size and placed on a stabilized zirconia batt. The stabilized zirconia batt is usually sprinkled with 325 mesh zirconia sand to prevent any reaction between the batt and the ceramic film.

The sanded batt with the film placed on top of it is then placed in a kiln, and the temperature increased slowly to about 900° F. to burn off the temporary binder. The rate of rise of temperature initially is very slow, to minimize any disturbance in the film, in order that the geometry is not disturbed or distorted. After the temporary binder is burned off, the rate of rise of temperature is increased till the maturing temperature of about 2550° F. is reached. At this point in the firing cycle the kiln is allowed to soak at the maturing temperature from one-half to four hours. The power is cut off at the end of the soaking period and the kiln allowed to cool.

The ceramic sheets are then silvered and ceramic dielectric capacitors are produced by well-known techniques.

In conclusion, it is pointed out that the addition of the minor amount of rare earth oxide, oxalate, fluoride or carbonate is principally responsible for raising the dielectric constant to in excess of 10,000. With barium titanate as the major ingredient, the addition of strontium titanate and/or calcium zirconate is responsible for shifting the Curie point down scale from 125° C. Calcium zirconate also acts to shift the peak of the characteristic curve and helps to broaden the peak. The manganese oxide acts as a flux to lower the maturing temperature.

There will now be obvious to those skilled in the art modifications of the described inventive concept, which do not essentially depart from the spirit and scope of the invention, and it is intended that such modifications be embraced within such spirit and scope as defined by the aforegoing description and following claims.

What is claimed is:

1. A ceramic dielectric composition characterized by a dielectric constant at least about 10,000 at 25° C., said composition consisting essentially of the following, percentages given by weight and totaling substantially 100%: barium titanate 70–80%; strontium titanate 6–12%; calcium zirconate 10–15%; manganese oxide 0.1–0.3%; at least one oxide of a rare earth metal selected from the group consisting of samarium and praseodymium 0.20–0.75%.

2. A ceramic dielectric composition characterized by a dielectric constant at least about 10,000 at 25° C., said composition consisting essentially of the following, percentages given by weight and totaling substantially 100%: barium titanate 75–85%; strontium titanate 8–10%; calcium zirconate 12–14%; manganese oxide 0.2–0.4%; at least one oxide of a rare earth metal selected from the group consisting of samarium and praseodymium 0.20–0.75%.

3. A capacitor characterized by maximum capacitance value in the room temperature range of approximately 20° C. to 30° C., the capacitance value deviating approximately by at most 30% at 0° C. and 50° C., said capacitor having as dielectric a ceramic composition characterized by a dielectric constant at least about 10,000 at 25° C., said composition consisting essentially of the following percentages given by weight and totaling substantially 100%: barium titanate 70–80%; strontium titanate 6–12%; calcium zirconate 10–15%; manganese oxide 0.1–0.3%; at least one oxide of a rare earth metal selected from the group consisting of samarium and praseodymium 0.20–0.75%.

4. A capacitor characterized by maximum capacitance value in the room temperature range of approximately 20° C. to 30° C., the capacitance value deviating approximately by at most 30% at 0° C. and 50° C., said capacitor having as dielectric a ceramic composition characterized by a dielectric constant at least about 10,000 at 25° C., said composition consisting essentially of the following percentages given by weight and totaling substantially 100%: barium titanate 75–85%; strontium titanate 8–10%; calcium zirconate 12–14%; manganese oxide 0.2–0.4%; at least one oxide of a rare earth metal selected from the group consisting of samarium and praseodymium 0.20–0.75%.

5. A method of making a ceramic dielectric composition comprising mixing to a homogeneous blend materials consisting essentially of the following, percentages given by weight and totaling substantially 100%: barium titanate 70–80%; strontium titanate 6–12%; calcium zirconate 10–15%; manganese carbonate 0.1–0.3%; at least one oxide of a rare earth metal selected from the group consisting of samarium and praseodymium 0.20–0.75%, together with a binder, heating said mixture to a temperature sufficient to burn off said binder, further heating the mixture to maturity temperature, and soaking it at such maturity temperature, and thereafter cooling the resultant reaction product.

6. A method of making a ceramic dielectric composition comprising mixing to a homogeneous blend materials consisting essentially of the following, percentages given by weight and totaling substantially 100%: barium titanate 70–80%; strontium titanate 6–12%; calcium zirconate 10–15%; manganese carbonate 0.1–0.3%; at least one oxide of a rare earth metal selected from the group consisting of samarium and praseodymium 0.20–0.75%, together with a binder, heating said mixture to a temperature of the order of 900° F., further heating the mixture to maturity temperature of the order of 2550° F., and soaking it at such maturity temperature, and thereafter cooling the resultant reaction product.

7. A method of making a ceramic dielectric composition comprising mixing to a homogeneous blend materials consisting essentially of the following, percentage given by weight and totaling substantially 100%: barium titanate 75–85%; strontium titanate 8–10%; calcium zirconate 12–14%; manganese carbonate 0.2–0.4%; at least one oxide of a rare earth metal selected from the group consisting of samarium and praseodymium 0.20–0.75%, together with a binder, heating said mixture to a temperature sufficient to burn off said binder, further heating the mixture to maturity temperature, and soaking it at such maturity temperature, and thereafter cooling the resultant reaction product.

8. A method of making a ceramic dielectric composition comprising mixing to a homogeneous blend materials consisting essentially of the following, percentages given by weight and totaling substantially 100%: barium titanate 75–85%; strontium titanate 8–10%; calcium zirconate 12–14%; manganese carbonate 0.2–0.4%; at least one oxide of a rare earth metal selected from the group consisting of samarium and praseodymium 0.20–0.75%, together with a binder, heating said mixture to a temperature of the order of 900° F., further heating the mixture to maturity temperature of the order of 2550° F., and soaking it at such maturity temperature, and thereafter cooling the resultant reaction product.

References Cited in the file of this patent

UNITED STATES PATENTS

| | | |
|---|---|---|
| 2,402,516 | Wainer | June 18, 1946 |
| 2,520,376 | Roup et al. | Aug. 29, 1950 |
| 2,985,700 | Johnston | May 23, 1961 |

OTHER REFERENCES

Bradley: Ceramic Age, October 1957, pages 29–31, "What About the Rare Earth?"